March 27, 1956 J. J. OKRENT 2,740,109

PULSE GENERATOR

Filed Dec. 19, 1946 2 Sheets-Sheet 1

INVENTOR.
JASPER J. OKRENT

BY Harry C. Page

ATTORNEY

March 27, 1956 J. J. OKRENT 2,740,109

PULSE GENERATOR

Filed Dec. 19, 1946 2 Sheets-Sheet 2

INVENTOR.
JASPER J. OKRENT
BY Harry B. Page
ATTORNEY 2,740,109

PULSE GENERATOR

Jasper J. Okrent, Great Neck, N. Y., assignor to Hazeltine Research, Inc., Chicago, Ill., a corporation of Illinois Application December 19, 1946, Serial No. 717,288

12 Claims. (Cl. 340—345)

Figure 1:
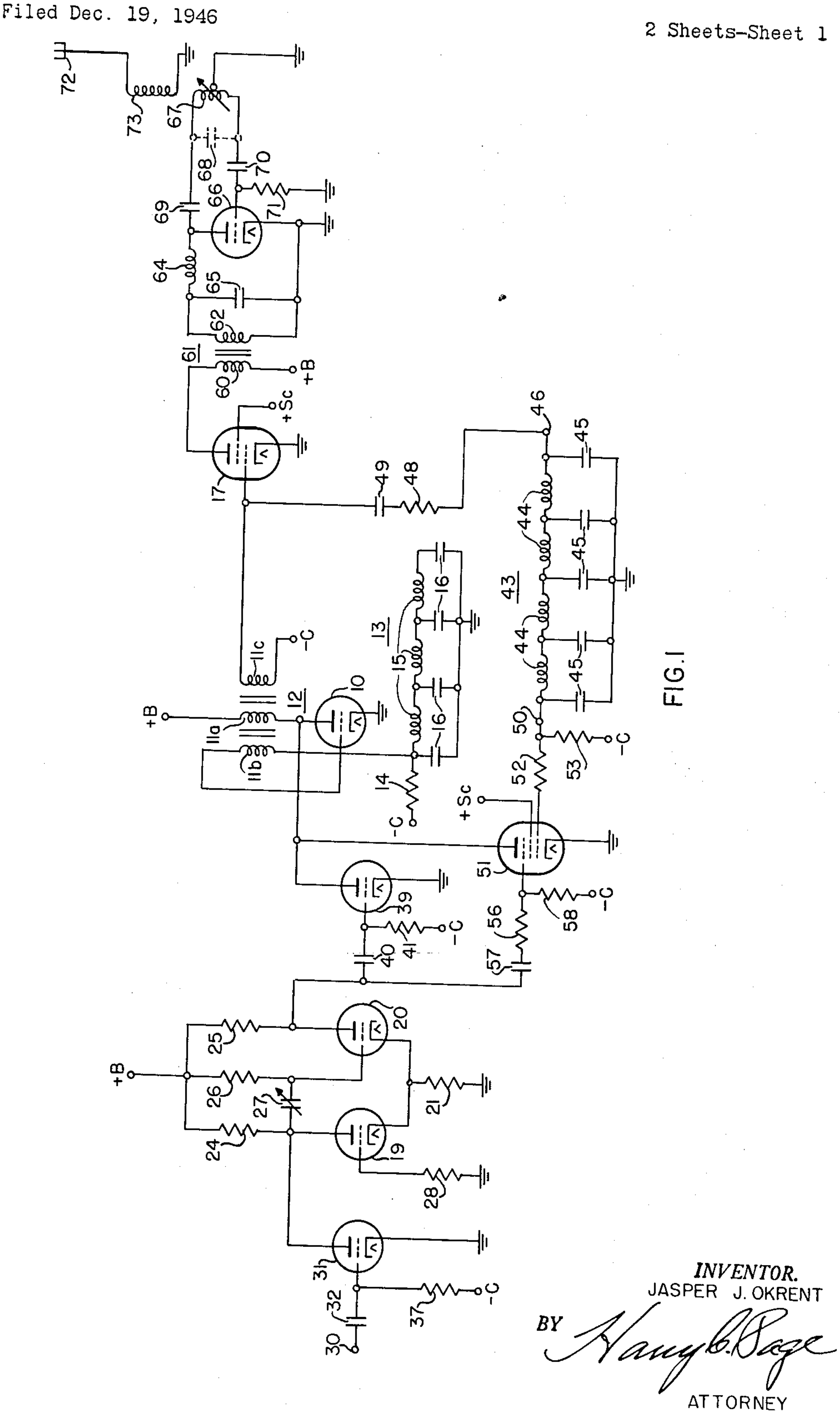

This invention is directed to arrangements for generating a plurality of time-spaced pulses and, particularly, to arrangements for generating, in response to a single control signal, a plurality of pulses having accurate predetermined time separations between the leading edges of successive pulses. Such an arrangement is useful for controlling the operation of a pulse-modulated radio-frequency transmitter which transmits a plurality of groups of pulse-modulated radio-frequency signals in accordance with a predetermined plan or code and, hence, will be described in that connection.

Heretofore the operation of many generators of time-spaced pulses has been controlled by signals which are developed by a shock-excited resonant circuit. In such arrangements the application of an impulse to the resonant circuit is effective to develop a plurality of cycles of damped oscillations, the positive half cycles of which may be utilized to trigger the pulse generator into operation. Such an arrangement possesses two serious disadvantages for certain applications, for example the generation of coded signals wherein the accuracy of spacings of the order of several microseconds is one of the criteria. Firstly, only a limited number of triggering signals may practically be realized from the action of a single shock-exciting control signal since the train of damped oscillations rapidly attenuates below the useful level. Thus only the initial or high-amplitude oscillations may be employed for triggering purposes. Secondly, the interval between the leading edges of the series of output pulses of prior pulse-generating arrangements of the type mentioned above is not as uniform as desired. This is due to the different amplitudes of the successive half cycles of the damped oscillations and the consequent different curvatures thereof at the triggering level of the pulse generator. Accordingly, the triggering operation is not accomplished on each of the half cycles of the damped oscillations at such a time that the time separation between the leading edges of the generated series of pulses is uniform.

It is an object of the invention, therefore, to provide a new and improved arrangement for generating a plurality of time-spaced pulses which avoids one or more of the disadvantages and limitations of prior pulse-generating arrangements.

It is another object of the invention to provide a new and improved arrangement for generating a plurality of accurately spaced pulses in response to the application of a single control signal to a pulse generator.

It is a further object of the present invention to provide a new and improved arrangement for generating a plurality of high-frequency time-spaced pulses which have substantially constant amplitudes and spacings between the leading edges thereof.

In accordance with the instant invention, an arrangement for generating a plurality of time-spaced pulses comprises pulse-generating means responsive to a control signal for generating a first pulse and means responsive to the control signal for deriving a first control potential having a time duration greater than that of the aforesaid first pulse. The pulse generator in accordance with the present invention also includes means external to said generating means and responsive to the pulse output of the generating means for deriving at predetermined times after the generation of each pulse thereof second control potentials having time durations less than that of the first control potential. The generator additionally includes means coupled to said generating means but external thereto and responsive to the first control potential and each of the second control potentials at the times of coincidence thereof for causing the generating means to generate a series of pulses following the first pulse.

For a better understanding of the present invention, together with other and further objects thereof, reference is had to the following description taken in connection with the accompanying drawings, and its scope will be pointed out in the appended claims.

Figure 2:
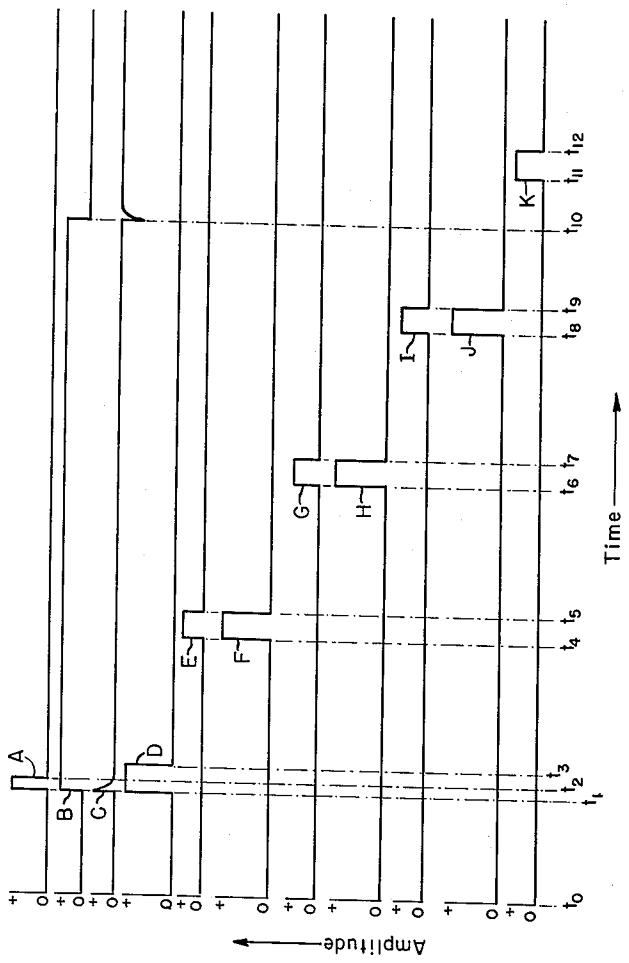

In the drawings, Fig. 1 is a schematic diagram of an arrangement embodying the present invention for generating a plurality of time-spaced pulses; and Fig. 2 comprises graphs employed in explaining the operation of the Fig. 1 arrangement.

Referring now more particularly to Fig. 1 of the drawings, there is represented schematically an arrangement for generating a plurality of time-spaced pulses. This arrangement comprises a pulse-generating means which is responsive to a control signal, in a manner to be made clear hereinafter, for generating a first pulse. This generator comprises a blocking oscillator which includes a triode electron tube 10. The cathode of tube 10 is grounded and a source of space current +B is connected to the anode through a first winding 11a of a pulse transformer 12. A second winding 11b of the transformer 12, connected between the control electrode of tube 10 and an artificial transmission-line section 13 and inductively coupled with the first winding 11a, affords regenerative feedback between the output and the input circuits of the blocking oscillator. Transmission-line section 13, which is utilized for controlling the duration of each pulse generated by the blocking oscillator, includes a plurality of series-connected inductors 15, 15 and shunt-connected condensers 16, 16, the common terminal of the latter elements being grounded. The blocking oscillator is normally maintained in a nonconductive condition by a negative potential which is applied to the control electrode through a resistor 14 and the winding 11b from a source indicated −C. A third winding 11c of the transformer 12 is included in the output circuit of the blocking oscillator and is connected between a source of potential −C and the control electrode of a pulse amplifier including an electron tube 17, which amplifier will be described in greater detail subsequently.

The pulse generator in accordance with the instant invention also includes means responsive to a control signal for deriving a first control potential having a time duration greater than that of the pulse developed by the blocking oscillator. This means comprises a relaxation oscillator, specifically a univibrator, including triode electron tubes 19 and 20, the cathodes of which are connected to ground through a common cathode resistor 21. The anodes of the triodes 19 and 20 are connected to a source of potential +B through resistors 24 and 25, respectively. The control electrode of tube 20 is connected to the last-mentioned source through a resistor 26 and is also connected to the anode of the triode 19 through an adjustable coupling condenser 27. The resistor-condenser combination 26, 27 in the input circuit of the tube 20 preferably has a time constant which is long with respect to the duration of a pulse generated by the blocking oscillator including the tube 10. The control electrode of tube 19 is connected to ground through the grid-leak resistor 28.

The circuit for applying the control signal to the univibrator includes an input terminal 30 which is coupled through a coupling condenser 32 to the input circuit of an amplifier including a triode 31. The cathode of triode 31 is connected to ground while the anode thereof is directly connected to the anode of the triode 19. The control electrode of triode 31 is connected through a resistor 37 to a source of negative bias −C which maintains the triode 31 normally biased to cutoff Output signals from the univibrator are applied to the input circuit of a triode amplifier 39 through a coupling condenser 40 which interconnects the anode of the tube 20 and the control electrode of the amplifier 39. The latter is normally biased to cutoff by a negative potential from a source −C which is applied to the control electrode of the tube through a resistor 41. The resistor-condenser combination 41, 40, which serves as a differentiating circuit, has a time constant which is short with respect to the duration of the first control potential which is developed by the univibrator in the output circuit of the tube 20. The cathode of the amplifier 39 is grounded while the anode is connected directly to the anode of tube 10 of the blocking oscillator for a purpose to be explained subsequently.

A time-delay means, preferably in the form of an artificial transmission-line section 43, comprises a means responsive to the pulse output of the blocking oscillator for deriving at predetermined times after the generation of each pulse thereof second control potentials having durations less than that of the first control potential which is developed by the univibrator. Transmission-line section 43 is of well-known construction and includes a plurality of series-connected inductors 44, 44 and intermediate shunt-connected condensers 45, 45, the common terminal of the condensers being connected to ground. An input terminal 46 of the transmission-line section 43 is connected to the control electrode of the pulse amplifier 17 through a resistor 48 and a coupling condenser 49 while the output terminal 50 of the transmission-line section is connected to the control electrode of a pentode 51 through a resistor 52. A negative potential from a source −C is connected to the terminal 50 through a resistor 53. The impedance of the last-mentioned source and that of the resistor 53 are selected to provide a termination which corresponds to the impedance of the transmission-line section 43.

The pentode 51 comprises means responsive to the first control potential developed by the univibrator and each of the second control potentials from the output terminal 50 of transmission-line section 43 at the times of coincidence thereof for causing the blocking oscillator to generate a series of pulses following the first pulse produced thereby. The anode of the pentode 51 is connected to the anode of the tube 10 of the blocking oscillator and the screen electrode is connected to the source +Sc. The cathode of the pentode 51 is grounded while the suppressor electrode is coupled to the anode of the tube 20 of univibrator through a resistor 56 and a coupling condenser 57. The suppressor electrode is also connected through a resistor 58 to a source of negative potential indicated −C which, in conjunction with the similar potential applied to the control electrode of the pentode 51, maintains the latter in a normally nonconductive condition. The time constant of the resistor-condenser combination 56, 57, 58 is preferably long with relation to the time duration of the first control potential developed by the univibrator, while the resistor 58 preferably has a larger value than that of the resistor 56.

The primary winding 60 of a pulse transformer 61 is included in the output circuit of the tube 17 and the other operating potentials for this tube are supplied by the sources indicated +B and +Sc. The secondary winding 62 of the pulse transformer 61 is connected to the anode and the cathode electrode of a high-frequency oscillator including a triode electron tube 66 through a choke 64 for the high-frequency signals developed by the oscillator. A by-pass condenser 65 for these high-frequency signals is connected across secondary winding 62. A frequency-determining circuit comprises an adjustable inductor 67, the center tap of which is grounded, and a condenser 68 which is coupled by way of condensers 69 and 70 to the anode and control electrodes, respectively, of the triode 66. Condenser 68 is represented in broken-line construction since it may be comprised, in whole or in part, of the distributed capacitance of the inductor 67 and any stray capacitance associated therewith. A grid-leak resistor 71 is connected between the control electrode of tube 66 and ground.

Output signals from the high-frequency oscillator are radiated by an antenna-ground system 72 which is inductively coupled to the adjustable inductor 67 by means of an inductor 73. Tube 66 of the high-frequency oscillator is normally in a nonconductive state since the tube is ordinarily lacking excitation potentials. However, the pulse transformers 12 and 61 are poled so that the application of a negative signal to the anode of tube 10 of the blocking oscillator is effective to apply a positive potential between the anode and cathode electrodes of the tube 66 of the high-frequency oscillator so that oscillations may be developed therein.

The described arrangement of Fig. 1 may be employed as the transmitting unit of a radio locator which transmits coded signals in accordance with a predetermined plan. The input terminal 30 may be connected to the output terminal of the receiver of the radio locator so that the operation of the transmitting unit is controlled by the output signal of the receiver. The remaining units of the above-mentioned radio locator have been omitted from the drawings since a complete understanding of the operation of the pulse generator of the instant invention may be obtained from the explanation of the operation of the circuit arrangement represented in Fig. 1.

Considering now the operation of the described arrangement, reference is made to the curves of Fig. 2. Curve A represents the positive control pulse which is applied to the input terminal 30 at time $t_1$. The pulse overcomes the bias on tube 31 and renders it conductive thereby developing a negative pulse in the output circuit of the tube which is applied by the coupling condenser 27 to the control electrode of the tube 20 of the univibrator. The latter has two operating conditions, the first wherein the tube 19 is biased to cutoff while the other tube 20 is in a conductive state. The negative potential, which is applied to the control electrode of tube 20, drives it to cutoff and the potential developed across the resistor 21 falls below a predetermined value so that tube 19 becomes conductive. The univibrator has now assumed its second operating condition. The time constant of resistor-condenser combination 26, 27 is such that a relatively long first control potential of positive polarity, as illustrated in curve B of Fig. 2, having steep leading and trailing edges is developed during the interval $t_1$–$t_{10}$. The output pulse of the univibrator is applied to the suppressor electrode of the pentode 51 through the long time-constant circuit including the resistor 56 and the condenser 57 without impairment.

This first control potential is also applied to the resistor-condenser combination 41, 40 and is differentiated thereby to produce, at times $t_1$ and $t_{10}$, the short duration signals illustrated in curve C of Fig. 2. The positive portion at time $t_1$ constitutes a triggering signal which is amplified and reversed in polarity by the tube 39 and then applied to the anode of the tube 10 of the blocking oscillator. The negative signal which is applied to the anode of tube 10 is translated by the transformer windings 11a and 11b to the control electrode of the tube where it appears with positive polarity. The translated signal overcomes the negative bias on the control electrode of tube 10 and initiates a cycle of operation of the blocking oscillator in the well-known manner. A traveling wave of negative polarity is propagated along the transmission-line section 13 from the input end to the remote end where the wave is reflected without a reversal in polarity and travels to the input end. The reflected wave combines with the original wave to produce across the line-terminating resistor 14 a resultant wave of negative polarity which is substantially twice the amplitude of the applied wave, thus developing a high negative bias which is effective to drive the tube 10 to cutoff, thereby terminating the output pulse abruptly at time $t_3$ as shown in curve D. Neglecting the transmission time of a signal through the amplifier 39, the leading edge of the output pulse of curve D therefor coincides with the leading edges of the pulses of curves B and C.

The output pulse of the blocking oscillator is amplified by tube 17 and is applied by the transformer 61 to the anode and cathode electrodes of the high-frequency oscillator including tube 66 with such polarity that oscillations are initiated. These oscillations continue for the duration of the output pulse of the blocking oscillator and the generated high-frequency oscillations are radiated by the antenna-ground system 72 which is inductively coupled to the adjustable inductor 67 of the frequency-determining circuit.

The output pulse of the blocking oscillator is also applied at time $t_1$ to the terminal 46 of the transmission-line section 43. After a predetermined time delay $t_1$–$t_4$, as determined by the time-delay characteristic of the transmission-line section 43, a positive pulse of somewhat reduced amplitude with respect to that of the output pulse of the blocking oscillator, as illustrated in curve E, is derived at the output terminal 50 for application to the control electrode of the pentode 51. The coincident application of the positive first and second control potentials, as will be appreciated from the representations of curves B and E, to the input electrodes of the pentode 51 during the interval $t_4$–$t_5$ is effective to overcome the bias on the control electrode and the suppressor electrode, thereby rendering the pentode 51 conductive during this interval. Consequently, the potential of the anode of the pentode 51 decreases during this interval and a negative pulse is applied to the anode of the tube 10 of the blocking oscillator whereupon a second output pulse, which is illustrated in curve F of Fig. 2, is developed during interval $t_4$–$t_5$ for application to the pulse amplifier 17 and its associated high-frequency oscillator. Neglecting the transmission time through pentode 51, the second output pulse is accurately separated from the first pulse by the delay interval $t_1$–$t_4$ of the transmission-line section 43.

In the manner previously described in connection with the first pulse which is illustrated in curve D, the transmission-line section 43 is effective to utilize the second output pulse, illustrated in curve F, to produce another control potential pulse, shown in curve G, which is similar to the control pulse of curve E and spaced therefrom by the interval $t_4$–$t_8$. Coincident mixing of the first control potential from the univibrator and the additional second control potential pulse from the transmission-line section 43 occurs to produce a third output pulse, represented by curve H, having the desired time separation $t_4$–$t_6$ from the preceding output pulse. After each additional time of coincidence of the first and second control potentials from the univibrator and the transmission-line section 43 an additional output pulse is produced. It will be noted that the first control potential from the univibrator terminates at time $t_{10}$ at which time the tubes 19 and 20 are restored to their original condition. Hence, during the time $t_{11}$–$t_{12}$ only the control potential from the transmission-line section 43, as shown in curve K, is applied to the pentode 51. Due to the magnitude of the negative bias on the suppressor electrode of the tube 51, the pulse illustrated in curve K is unable to render tube 51 conductive. Thus the series of output pulses from the blocking oscillator following the first pulse thereof terminates with the pulse shown in curve J. Accordingly, the series of high-frequency pulses radiated by the antenna-ground system 72 as a result of the application of a single-control signal to the input terminal 30 ceases at the end of the intervals $t_8$–$t_9$. The application of a second control signal, similar to that of curve A, to the input terminal 30 at some later time is effective to develop another series of output pulses similar to those previously described.

It will be manifest that a relatively simple adjustment of the condenser 27 and hence the time constant of the resistor-condenser combination in the input circuit of the tube 20 of the univibrator is effective to alter the number of pulses in the developed series of time-spaced pulses while adjustments of the transmission-line sections 13 and 43 by well-known means, not shown, are effective to alter, respectively, the pulse width and the pulse separation of the output signal of the univibrator.

From the above description of the invention, it will be apparent that a pulse generator embodying the present invention is capable of producing, in response to a single control signal, a series of output pulses which have accurately corresponding pulse durations, pulse separations, and pulse amplitudes.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for generating a plurality of time-spaced pulses comprising, blocking oscillator means normally maintained in a nonconductive condition and rendered conductive in response to a control signal for generating a first pulse, means responsive to said control signal for deriving a first control potential having a time duration greater than that of said pulse, means external to said blocking oscillator means and responsive to the pulse output of said blocking oscillator means for deriving at predetermined times after the generation of each pulse thereof second control potentials having time durations less than that of said first control potential, and means coupled to said blocking oscillator means and responsive to said first control potential and each of said second control potentials at the times of coincidence thereof for causing said blocking oscillator means to generate a series of pulses following said first pulse.

2. An arrangement for generating a plurality of time-spaced pulses comprising, blocking oscillator means normally maintained in a nonconductive condition and rendered conductive in response to a control signal for generating a first pulse, a transmission-line section coupled to said blocking oscillator means for controlling the duration of each output pulse thereof, means responsive to said control signal for deriving a first control potential having a time duration greater than that of said pulse, means external to said blocking oscillator means and responsive to the pulse output of said blocking oscillator means for deriving at predetermined times after the generation of each pulse thereof second control potentials having time durations less than that of said first control potential, and means coupled to said blocking oscillator means and responsive to said first control potential and each of said second control potentials at the times of coincidence thereof for causing said blocking oscillator means to generate a series of pulses following said first pulse.

3. An arrangement for generating a plurality of time-spaced pulses comprising, pulse-generating means responsive to a control signal for generating a first pulse, means having two operating conditions and caused to alternate from one operating condition to the other by said control signal for deriving a first control potential having a time duration greater than that of said pulse, means external to said generating means and responsive to the pulse output of said generating means for deriving at predetermined times after the generation of each pulse thereof second control potentials having time durations less than that of said first control potential, and means coupled to said generating means but external thereto and responsive to said first control potential and each of said second control potentials at the times of coincidence thereof for causing said generating means to generate a series of pulses following said first pulse.

4. An arrangement for generating a plurality of time-spaced pulses comprising, pulse-generating means responsive to a control signal for generating a first pulse, univibrator means responsive to said control signal for deriving a first control potential having a time duration greater than that of said pulse, means external to said generating means and responsive to the pulse output of said generating means for deriving at predetermined times after the generation of each pulse thereof second control potentials having time durations less than that of said first control potential, and means coupled to said generating means but external thereto and responsive to said first control potential and each of said second control potentials at the times of coincidence thereof for causing said generating means to generate a series of pulses following said first pulse.

5. An arrangement for generating a plurality of time-spaced pulses comprising, pulse-generating means responsive to a control signal for generating a first pulse, means responsive to said control signal for deriving a first control potential having a time duration greater than that of said pulse, time-delay means external to said generating means and responsive to the pulse output of said generating means for deriving at predetermined times after the generation of each pulse thereof second control potentials having time durations less than that of said first control potential, and means coupled to said generating means but external thereto and responsive to said first control potential and each of said second control potentials at the times of coincidence thereof for causing said generating means to generate a series of pulses following said first pulse with a time spacing between each of said pulses effectively corresponding to the time-delay characteristic of said time-delay means.

6. An arrangement for generating a plurality of time-spaced pulses comprising, pulse-generating means responsive to a control signal for generating a first pulse, means coupled to said generating means for providing a uniform time duration for each pulse generated thereby, means responsive to said control signal for deriving a first control potential having a time duration greater than that of said pulse, time-delay means external to said generating means and responsive to the pulse output of said generating means for deriving at predetermined times after the generation of each pulse thereof second control potentials having time durations less than that of said first control potential, and means coupled to said generating means but external thereto and responsive to said first control potential and each of said second control potentials at the times of coincidence thereof for causing said generating means to generate a series of pulses following said first pulse with a time spacing between each of said pulses effectively corresponding to the time-delay characteristic of said time-delay means.

7. An arrangement for generating a plurality of time-spaced pulses comprising, pulse-generating means responsive to a control signal for generating a first pulse, means responsive to said control signal for deriving a first control potential having a time duration greater than that of said pulse, a transmission-line section external to said generating means and responsive to the pulse output of said generating means for deriving at predetermined times after the generation of each pulse thereof second control potentials having time durations less than that of said first control potential, and means coupled to said generating means but external thereto and responsive to said first control potential and each of said second control potentials at the times of coincidence thereof for causing said generating means to generate a series of pulses following said first pulse.

8. An arrangement for generating a plurality of time-spaced pulses comprising, pulse-generating means responsive to a control signal for generating a first pulse, means responsive so said control signal for deriving a first control potential having a time duration greater than that of said pulse, means external to said generating means and responsive to the pulse output of said generating means for deriving at predetermined times after the generation of each pulse thereof second control potentials having time durations less than that of said first control potential, and an electron tube coupled to said generating means but external thereto and normally maintained in a nonconductive condition and rendered conductive by said first control potential and each of said second control potentials at the times of coincidence thereof for causing said generating means to generate a series of pulses following said first pulse.

9. An arrangement for generating a plurality of time-spaced pulses comprising, pulse-generating means responsive to a control signal for generating a first pulse, means responsive to said control signal for deriving a first control potential having a time duration greater than that of said pulse, means external to said generating means and responsive to the pulse output of said generating means for deriving at predetermined times after the generation of each pulse thereof second control potentials having time durations less than that of said first control potential, an electron tube normally maintained in a nonconductive condition and having an anode and a cathode and at least two electrodes in the space-current path therebetween, said anode being coupled to said generating means, and means for applying said first control potential to one of said electrodes and said second control potential to the other of said electrodes to render said electron tube conductive at the times of coincidence of said first and second control potentials to cause said generating means to generate a series of pulses following said first pulse.

10. An arrangement for generating a plurality of time-spaced pulses comprising, pulse-generating means responsive to a control signal for generating a first pulse, means responsive to said control signal for deriving a first control potential having a time duration greater than that of said pulse, means responsive to the pulse output of said generating means for deriving at predetermined times after the generation of each pulse thereof second control potentials having time durations less than that of said first control potential, and an electron tube external to said generating means and including two input circuits and having an output circut coupled to said generating means, means for applying said first control potential to one of said input circuits and said second control potential to the other input circuit to develop a control effect in said output circuit of said electron tube at the times of coincidence of said first and second control potentials for causing said generating means to generate a series of pulses following said first pulse.

11. An arrangement for generating a plurality of time-spaced pulses comprising: pulse-generating means responsive to a control signal for developing a first pulse; means responsive to said control signal for deriving a first control potential having a time duration greater than that of said pulse; means external to said generating means and responsive to the pulse output of said generating means for deriving at predetermined times after the generation of each pulse thereof second control potentials having time durations less than that of said control potential; and means coupled to said generating means but external thereto and responsive to said first control potential and each of said second control potentials at the time of coincidence thereof for causing said means to generate a series of pulses following said first pulse.

12. An arrangement for generating a plurality of time-spaced pulses comprising: blocking oscillator means normally maintained in a nonconductive condition and rendered conductive in response to a control signal for generating a first pulse; a transmission-line section coupled to said blocking oscillator means for controlling a duration of each output pulse thereof; means having two operating conditions and caused to alternate from one operating condition to the other by said control signal for deriving a first control potential having a time duration greater than that of said pulse; time-delay means external to said blocking oscillator means and responsive to the pulse output thereof for deriving at predetermined times after the generation of each pulse thereof second control potentials having time durations less than that of said first control potential; an electron tube external to said blocking oscillator means and including two input circuits and having an output circuit coupled to said generating means; and means for applying said first control potential to one of said input circuits and a second control potential to the other input circuit to develop a control effect in said output circuit at the times of coincidence of said first and second control potentials for causing said blocking oscillator means to generate a series of pulses following said first pulse.

References Cited in the file of this patent

UNITED STATES PATENTS

| | | |
|---|---|---|
| 2,212,173 | Wheeler | Aug. 20, 1940 |
| 2,418,521 | Morton | Apr. 8, 1947 |